United States Patent

Sorimachi

[15] 3,682,408
[45] Aug. 8, 1972

[54] FILM REWINDING DEVICE

[72] Inventor: Kanehiro Sorimachi, Yokohama, Japan

[73] Assignee: Canon Kabushiki Kaisha, Ota-ku, Tokyo, Japan

[22] Filed: March 31, 1970

[21] Appl. No.: 24,234

[52] U.S. Cl. .................................. 242/71.1
[51] Int. Cl. ...................... G03b 1/04, G03b 17/26
[58] Field of Search .......... 242/71.4, 71.5, 71.6, 71.1, 242/71.2

[56] References Cited

UNITED STATES PATENTS 2,063,331   12/1936   Nagel ..................... 242/71.4
2,559,892   7/1951    Mihalyi et al. ............. 242/71.4
3,481,260   12/1969   Ettischer et al. ....... 242/71.4 X

*Primary Examiner*—Stanley N. Gilreath
*Assistant Examiner*—Gregory A. Walters
*Attorney*—McGlew and Toren

[57] ABSTRACT

A film rewind device is characterized by a plural number of rollers which are made to contact, under pressure, a portion of the end of a spool within a cartridge which end projects out of the end plate of the cartridge, and at least one of the rollers is linked with a lever for rewinding the film 3 Claims, 2 Drawing Figures PATENTED AUG 8 1972  3,682,408
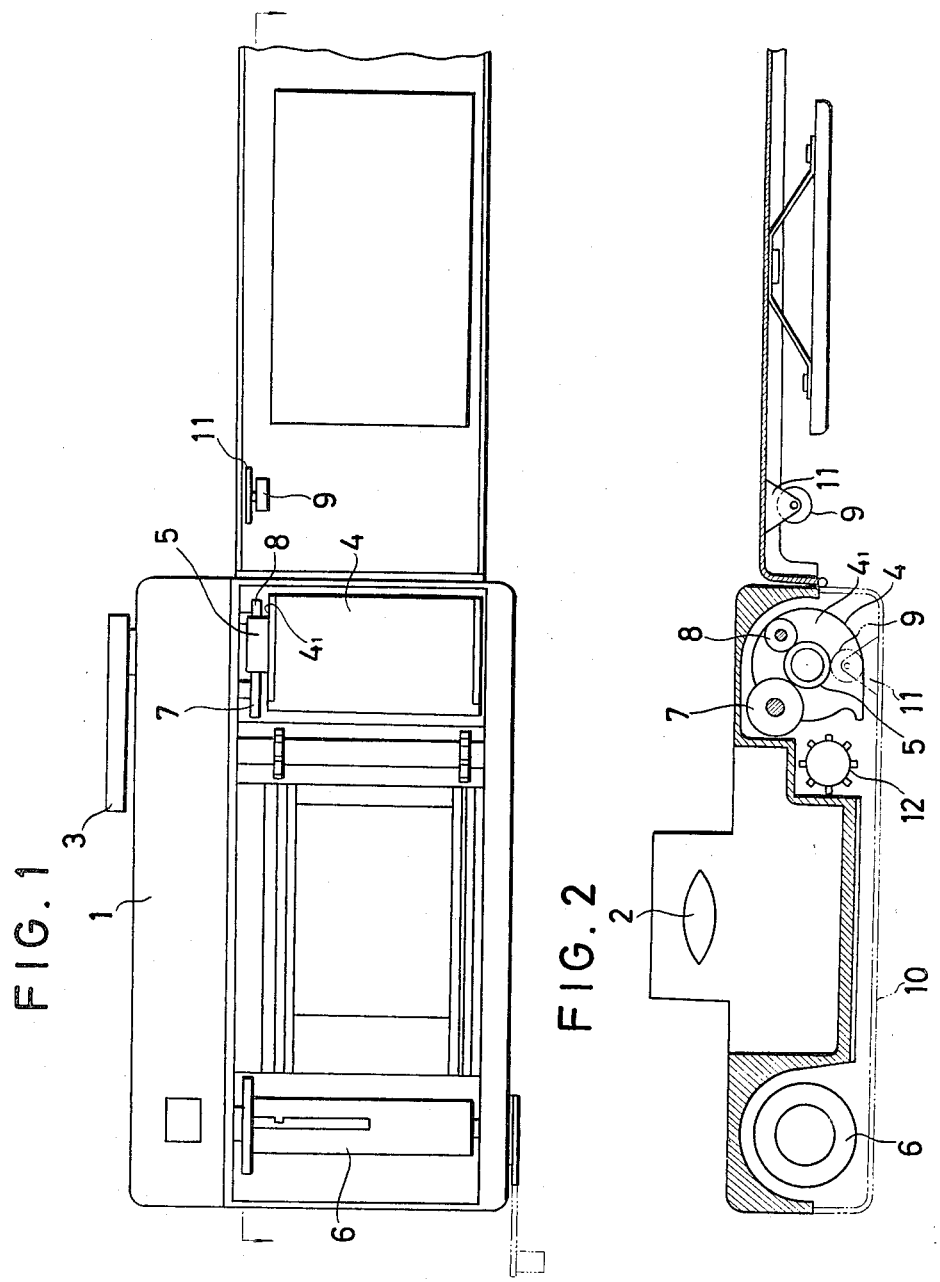
INVENTOR.
KANEHIRO
BY      SORIMACHI
McGlew & Toren
ATTORNEYS

FILM REWINDING DEVICE

SUMMARY OF THE INVENTION

The present invention relates to a rewind device for a camera which uses 35mm film placed in a cartridge, and particularly relates to a film winding or advancing device which includes a frictional roller drive operable to advance the correct frame length during each operation.

In the case of film supplied in a cartridge, a fork or winding member is inserted into a receptacle in the spool within the cartridge, then the film is rewound on the spool by rotating it by means of a rewind lever. Therefore in a camera of above-mentioned type, regardless of the size of the diameter of the film as rewound on the spool axle within the cartridge, one frame only of film must be always correctly rewound one frame at a time. Therefore, it is necessary to provide a frictional transmission or drive between the rewind lever and the cartridge spool so that the length of film rewound each time remains constant, since there is a tendency for slippage to occur as the diameter of the rewound film increases.

The present invention is intended to omit the above-mentioned slipping problem. Also in a conventional transmission, it is necessary to withdraw the fork or winding member or to provide a notch at one end of the cartridge chamber for loading and unloading the cartridge, and the present invention is intended to eliminate such considerations.

When, for the convenience of handling, the rewind lever is arranged at the right hand upper part when looking at the camera from the rear, and the cartridge is placed at right hand side as shown in the drawing, a very simple rewind mechanism may be set up.

The present invention shall be explained in detail with reference to the attached drawings in which:

FIG. 1 is a rear elevation showing a camera with its rear lid opened, and

FIG. 2 is a sectional view of the camera illustrated in FIG. 1.

Referring to the drawing, the camera includes a main body 1 in which a photographing lens 2 is mounted. A rewind lever 3 is located on the outside of the main body 1. Disposed within the main body is a cartridge 4 which has a spool axle 5 and another spool 6 is spaced from the cartridge on the opposite side of the lens 2.

The present invention provides a frictional rewind device which includes a plurality of rollers 7, 8 and 9 which contact with pressure an end portion of the spool axle 5 which extends outwardly from an end plate 4, of the cartridge 4. As can be seen in FIGS. 1 and 2, the rollers 7 and 8 are mounted in the main body 1 of the camera, while roller 9 is mounted in the rear lid 10. The rollers are angularly spaced from one another about the periphery of the end of the spool axle which they contact. At least one of the rollers, roller 7, is rotated by direct connection to the shaft of the rewind lever 3. In the embodiment shown in the drawing, the other two rollers 8 and 9 are idle rollers, and, as indicated above, roller 8 is supported in the main body 1 and the other roller 9 is supported in a bearing 11 secured to the rear lid 10. All of the rollers 7, 8 and 9 are placed in contact, under pressure, with the end of the spool axle by closing the rear lid 10.

By operating the rewind lever 3, un-exposed film, wound on the spool 6, is rewound through the rotations of a sprocket 12 onto the spool 5 in the cartridge 4 by the action of the driving roller 7. Thus the rewinding for each frame can be done correctly, and it is not necessary to provide a friction transmission mechanism between the rewind fork and the rewind lever. Also, by housing the cartridge at the side of the rewind lever 3, the driving mechanism can be very much simplified. On the other hand, when this device is applied to a camera in which photographing of film is done as the film is drawn out of the cartridge, the pressure contacting power of the rollers 7 to 9 is increased to reduce slipping.

What is claimed is:

1. A film rewinding device for use in a camera including a main body and a cover displaceably attached to said main body, a film cartridge located within said main body and including a spool axle extending therethrough and projecting from one end of said cartridge, a second spool located within said camera and spaced from said cartridge, a plurality of rollers located within said camera and disposed in frictional contact with the end of said spool axle projecting from said cartridge, said rollers being arranged in angularly spaced relationship to one another about said spool axle, and drive means accessible on the exterior of said camera and in operative engagement with one of said rollers for rotating one of said rollers which in turn rotates said spool axle in said cartridge for rewinding film therein from said second spool.

2. A film rewinding device, according to claim 1, wherein said cover is hinged to said camera body.

3. A film rewinding device, according to claim 1, wherein said cover includes a mounting bearing for rotatably supporting one of said rollers, said roller being mounted to project into contact with said spool axle and to press it into frictional engagement with the other of said rollers.

* * * * *